United States Patent
Mohammed

(10) Patent No.: US 12,184,477 B2
(45) Date of Patent: Dec. 31, 2024

(54) SYSTEMS AND METHODS FOR DETERMINING AND CORRECTING NETWORK FAILURES IN A WIRELESS TELECOMMUNICATIONS NETWORK

(71) Applicant: T-Mobile Innovations LLC, Overland Park, KS (US)

(72) Inventor: Zain Us Salekin Mohammed, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 440 days.

(21) Appl. No.: 17/563,232

(22) Filed: Dec. 28, 2021

(65) Prior Publication Data

US 2023/0208702 A1 Jun. 29, 2023

(51) Int. Cl.
*H04B 17/29* (2015.01)
*H04L 41/0654* (2022.01)
*H04W 24/04* (2009.01)
*H04W 24/08* (2009.01)

(52) U.S. Cl.
CPC ......... *H04L 41/0654* (2013.01); *H04W 24/04* (2013.01); *H04W 24/08* (2013.01)

(58) Field of Classification Search
CPC ............ H04L 41/0654; H04L 41/0681; H04L 41/142; H04W 24/04; H04W 24/08; H04B 17/15; H04B 10/0779; H04B 17/18; H04B 17/295
See application file for complete search history.

(56) References Cited

U.S. PATENT DOCUMENTS

| | | | | |
|---|---|---|---|---|
| 8,705,709 B2 * | 4/2014 | Hao | ........................ | H04W 4/00 379/179 |
| 8,897,754 B1 * | 11/2014 | Upadhyay | ............. | H04M 3/533 455/413 |
| 10,491,459 B1 * | 11/2019 | Andreas | ................ | H04W 24/08 |
| 2002/0120765 A1 * | 8/2002 | Boehmke | .................. | H04L 9/40 709/231 |
| 2011/0141913 A1 * | 6/2011 | Clemens | ............. | H04L 41/0681 370/242 |

(Continued)

OTHER PUBLICATIONS

3GPP TS 32.298 Charging Data Record (CDR) parameter description, v1.0.0 (Year: 2003).*

(Continued)

*Primary Examiner* — Andrew Wendell
(74) *Attorney, Agent, or Firm* — Shook, Hardy & Bacon L.L.P.

(57) ABSTRACT

Methods and systems for determining and correcting network failures in a wireless telecommunications network. The methods can include determining a rate of communications terminating to voicemail due to one or more network failures. The methods can also include determining if the rate of communications terminating to voicemail due to one or more network failures exceeds a threshold value. When the threshold is exceeded, an action can be performed. The action can include one or more of communicating an alert, providing a graphical representation of at least the rate of communications terminating to voicemail due to one or more network failures, or performing or recommending one or more mitigation steps.

20 Claims, 6 Drawing Sheets

(56) References Cited

U.S. PATENT DOCUMENTS

| | | | |
|---|---|---|---|
| 2014/0357237 A1* | 12/2014 | Bell | H04M 3/5335 |
| | | | 455/413 |
| 2016/0241429 A1* | 8/2016 | Froehlich | H04L 41/0631 |
| 2016/0379470 A1* | 12/2016 | Shurtz | H04W 4/16 |
| | | | 455/404.2 |
| 2022/0030112 A1* | 1/2022 | Benkreira | H04M 3/5158 |
| 2023/0094307 A1* | 3/2023 | Chisu | H04L 65/1095 |
| | | | 370/331 |

OTHER PUBLICATIONS

3GPP TS 32.298 Charging Data Record (CDR) parameter description, v11.10.0 (Year: 2014).*
3GPP TS 32.298 Charging Data Record (CDR) parameter description, v18.4.0 (Year: 2023).*

* cited by examiner

SYSTEMS AND METHODS FOR DETERMINING AND CORRECTING NETWORK FAILURES IN A WIRELESS TELECOMMUNICATIONS NETWORK

SUMMARY

The present disclosure is directed, in part, to systems and methods for determining and correcting network failures in a wireless telecommunications network, substantially as shown in and/or described in connection with at least one of the figures, and as set forth more completely in the claims.

In aspects set forth herein, a rate of communications terminating to voicemail due to one or more network failures is determined based on data associated with communications in a wireless telecommunications network. In various aspects, if the rate of communications terminating to voicemail due to one or more network failures exceeds a threshold value, an action is performed. In an aspect, the action can include one or more of communicating an alert, providing a graphical representation of at least the rate of communications terminating to voicemail due to one or more network failures, or performing or recommending one or more mitigation steps.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
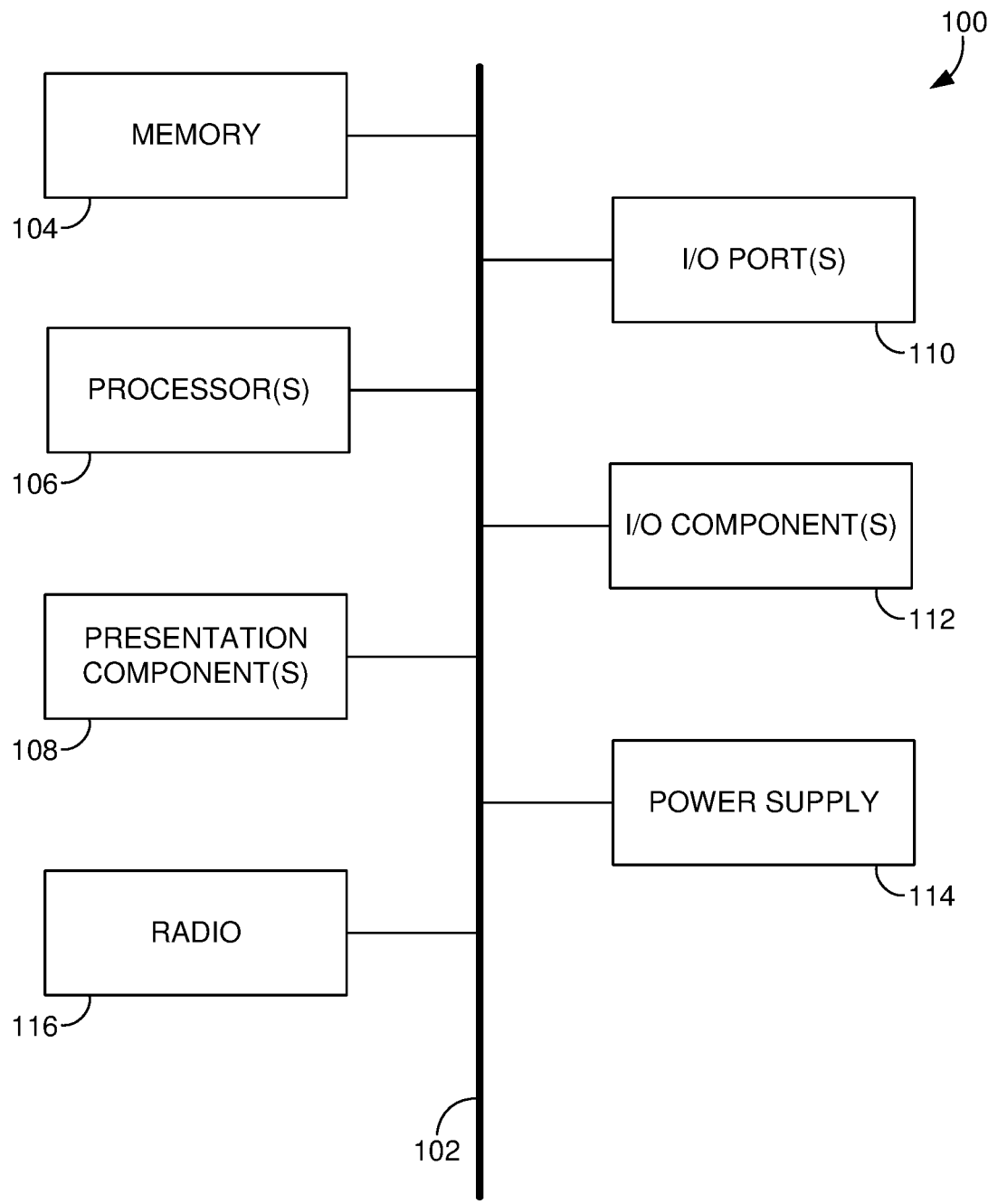
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CDR Charging Data Record
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
IMS IP Multimedia Subsystem
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TAS Telephony Application Server
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, 31$^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, to detect and/or correct wireless telecommunications network failures, certain conventional systems may rely on user and/or customer inquires or requests. For instance, certain conventional systems may respond when a certain number of user and/or customer inquiries regarding the network reach a certain level. Other conventional systems may attempt to detect one or more network failures through failure of initiation of calls. In these conventional systems, once a potential network failure is detected, a network provider can then attempt to identify the cause for the network failure(s) to be resolved. However, with such convention systems, it may be laborious and/or difficult to identify a cause for the network failures experienced by the user and/or customer. Further, certain conventional systems lack the ability to provide up-to-date information on potential network failures.

The systems and methods provided herein can alleviate one or more of the problems discussed above. For instance, in aspects, the systems disclosed herein can determine whether a rate of communications terminating to voicemail due to one or more network failures exceeds a threshold value, and when such a rate exceeds the threshold, an action can be performed. In an aspect, the action can include communicating an alert and/or communicating a graphical representation of the rate of communications terminating to voicemail due to one or more network failures. In one or more aspects, the graphical representation of the rate of communications terminating to voicemail due to one or more network failures can include a representation of the rate of communications terminating to voicemail due to one or more network failures over one or more predetermined time intervals. In the same or alternative aspects, the action can include performing one or more mitigating steps to correct the network failure. Optionally, the systems also include determining that at least a portion of the communications terminating to voicemail due to network failure exhibit one or more of the same or similar attributes, which can facilitate identifying and/or determining potential causes of the network failure, in an aspect. Further, since the systems and methods disclosed are associated with communications terminating to voicemail due to one or more network failures, the systems and methods disclosed herein can identify network failures that may arise after call initiation has occurred.

Accordingly, in one aspect, a computerized system is provided. The computerized system can include one or more processors and a non-transitory computer storage media storing computer-useable instructions. The computer-useable instructions, when used by the one or more processors, can cause the one or more processors to: receive data associated with communications in a wireless telecommunications network; determine a rate of communications terminating to voicemail due to one or more network failures; determine that the rate of communications terminating to voicemail due to one or more network failures exceeds a threshold value; and perform an action based on the rate of communications terminating to voicemail due to one or more network failures exceeding the threshold value.

In another aspect, a method for determining and correcting network failures in a wireless telecommunications network is provided. The method can include receiving data associated with communications in a wireless telecommunications network, and determining a rate of communications terminating to voicemail due to one or more network failures. The method can also include determining that the rate of communications terminating to voicemail due to one or more network failures exceeds a threshold value, and performing an action based on the determining the rate of communications terminating to voicemail exceeding the threshold value.

In yet another aspect, a computerized system is provided that includes one or more processors and a non-transitory computer storage media storing computer-useable instructions. The computer-usable instructions, when used by the one or more processors, cause the one or more processors to: receive data associated with communications in a wireless telecommunications network, where the data associated with communications in the wireless telecommunications network comprises charging data records; determine a rate of communications terminating to voicemail due to one or more network failures; determine that the rate of communications terminating to voicemail due to one or more network failures exceeds a threshold value; and communicate an alert indicating that the rate of communications terminating to voicemail due to one or more network failures exceeds the threshold value.

As used herein, user equipment (UE) (also referenced herein as a user device or device) can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, and a power supply 114. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
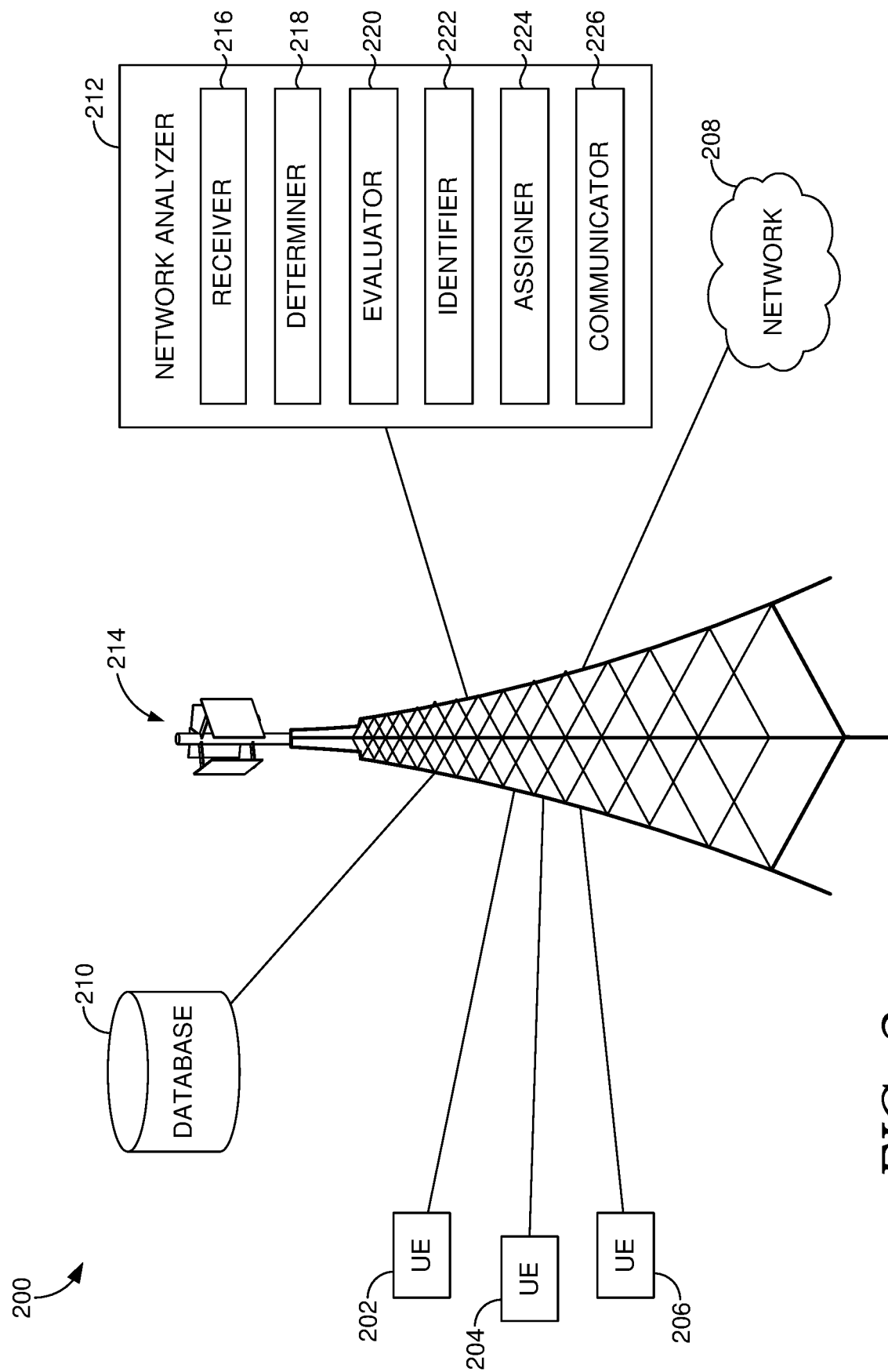
FIG. 2 depicts a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment 200 be interpreted as having any dependency or requirement relating to any one or combination of components illustrated.

The network environment 200 of FIG. 2 includes user devices 202, 204, and 206, a cell site 214, a network 208, a database 210, and a network analyzer 212. In the aspect depicted in FIG. 2, one cell site 214 is depicted. It should be understood that the network environment 200 can include any number of cell sites, including one cell site, or all cell sites within a geographical region, including all cell sites in an entire city, state, and/or country.

In the network environment 200, the user devices 202, 204, and 206 may take on a variety of forms, such as a server, a personal computer (PC), a user device, a smart phone, a smart watch, a laptop computer, a mobile phone, a mobile device, a tablet computer, a wearable computer, a personal digital assistant (PDA), a CD and/or DVD player, an MP3 player, an IoT device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, in aspects, a user device can include, for example, a display(s), a power source(s) (e.g., a battery), a data store(s), a speaker (s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some aspects, the user devices 202, 204, and 206 in the network environment 200 can optionally utilize the network 208 to communicate with other computing devices (e.g., a mobile device(s), a server(s), a personal computer(s), etc.) through the cell site 214 using any one of a plurality of wireless communication protocols, such as 3G, 4G/LTE, 5G and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components, some of which are discussed further below) can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (e.g., 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some aspects, the cell site 214 can be configured to communicate with user devices, such as the user devices 202, 204, and 206 that are located within the geographical area, or cell, covered by radio antennas of the cell site 214. The cell site 214 may include one or more base stations, base transmitter stations, radios, antennas, antenna arrays, power amplifiers, transmitters/receivers, digital signal processors, control electronics, GPS equipment, and the like. In an aspect, the cell site 214 of the present disclosure may communicate with at least one user device, such as the user device 202 via a wireless communication protocol, such as an LTE, 4G, and/or 5G wireless communication protocol.

As shown, the cell site 214 is in communication with the network analyzer 212, which comprises various components that are utilized, in various implementations, to determine and/or correct network failures and/or call failures in a wireless telecommunications network e.g., the network 208. In the same or alternative aspects, the network analyzer 212 can be a part of, or directly in communication with, the network 208. In aspects, the network analyzer 212 can include a receiver 216, a determiner 218, an evaluator 220, an identifier 222, an assigner 224, and a communicator 226. However, in other implementations, more or less components than those shown in FIG. 2 may be utilized to carry out aspects of the systems and methods described herein. Each of the components or sub components of the network analyzer 212 may be a stand-alone or combined processor, server, or other computer processing component that is suitably configured to perform the operations described herein.

In various aspects, the receiver 216 of the connection analyzer 212 is generally responsible for receiving data associated with communications in a wireless telecommunications network, e.g., the network 208. In aspects, the data can include any type of information associated with communications in a wireless telecommunications network that is suitable for use in the systems and methods disclosed herein. For instance, in an aspect, the data can include charging data records (CDRs). In aspects, the CDRs can be a collection of information associated with a telecommunication event in the network 208 and can include any or all properties of the telecommunication event, including, but not limited to: time of call, duration of call, identification of how call terminated, e.g., the terminating party did or did not receive the call, the call went to voicemail, etc., subscriber information, device information, network information, location information, and the like.

In various aspects, the data associated with communications in a wireless telecommunications network received by the receiver 216 can include data spanning any time interval. For instance, in one aspect, the data associated with communications in a wireless telecommunications network can include data over a six month period, a three month period, 60 days, 30 days, two weeks, one week, three days, two days, or one day. In certain aspects, any time interval for the data can be selected or predetermined by a user for a particular purpose. In the same or alternative aspects, the data associated with communications in a wireless telecommunications network can be for any geographic region, including nationally, one or more states, one or more cities or counties, one or more network nodes, and/or one or more cell sites. In various aspects, a user can select or predetermine a geographic region for the data for a particular purpose.

In certain aspects, the data associated with communications in a wireless telecommunications network can be generated by a server associated with the network 208, e.g., the core network. In an aspect, the server can include a telephony application server (TAS). In the same or alternative aspects, the data associated with communications in a wireless telecommunications network can comprise CDRs generated by a TAS. In an aspect, the TAS can be associated with a core network component, e.g., an Internet protocol (IP) multimedia subsystem (IMS).

In certain aspects, the data associated with communications in a wireless telecommunications network can be received or retrieved from a database associated with the network, e.g., the database 210 associated with the network 208. In aspects, the database 210 can include any information that is relevant to aid and/or facilitate one or more actions of the network analyzer 212 for determining and correcting network failures, e.g., on the network 208. In one aspect, the database 210 can include data associated with communications in a wireless telecommunications network that has been aggregated, e.g., according to one or more attributes, such as a time interval, geographical location, or any other CDR data field. In the same or alternative aspects, the database 210 may include any threshold values used by the network analyzer 212 or a component thereof, e.g., the evaluator 220 discussed below.

In certain aspects, the determiner 218 is generally responsible for determining a rate of communications terminating to voicemail due to one or more network failures. In various aspects, the determiner 218 can determine a rate of communications terminating to voicemail due to one or more network failures using the data associated with communications in a wireless telecommunications network received by the receiver 216. As used herein communications terminating to voicemail due to one or more network failures can mean any communications, e.g., voice calls, that were not received by the terminating party and went to voicemail due to the terminating party not being reachable in the network, and excludes communications or calls that terminated to voicemail due to: the terminating device was busy, e.g., the terminating and originating parties call each other at the same time, the terminating party did not answer the call, and/or the terminating party has instituted call settings for all calls to go to voicemail. In aspects, the received data, e.g., from the receiver 216, can include one or more data fields and/or identifiers that identify calls where the terminating device was busy, the terminating device did not answer the call, and the terminating party instituted settings for calls to go directly to voicemail. In such an aspect, the data fields and/or labels can be present in CDRs. A non-limiting list of example network failures that can lead to communications terminating to voicemail due to network failure, as contemplated by the system and methods disclosed herein, include a terminating device not currently being connected to the network due to device software and/or hardware issues, cell site hardware and/or software issues, network node hardware and/or software issues, and the like.

In various aspects, the determiner 218 can determine the rate of communications terminating to voicemail due to one or more network failures using the following quotient:

number of communications terminating to voicemail due to one or more network failures/total number of terminating communications.

Optionally, in certain aspects, the rate of communications terminating to voicemail due to one or more network failures can be determined or calculated as a percentage value. For instance, the quotient can be calculated and then the resulting value can be multiplied by 100 to determine a percentage value.

In certain aspects, the number of communications routed to voicemail due to wireless telecommunications network failure can include all communications or communication records, in the data associated with communications in the wireless telecommunications network, that include: one or more identifiers that a communication was forwarded to voicemail; and that also include one or more identifiers specifying that the terminating subscriber was not reachable in the wireless telecommunications network. As described above, a terminating subscriber that was not reachable in the wireless telecommunications network can include, but is not limited to, a terminating subscriber's device not currently being connected to the network due to device software and/or hardware issues, cell site hardware and/or software issues, network node hardware and/or software issues, and the like. In certain aspects, as discussed above, the one or more identifiers or data fields indicating that a communication was forwarded to voicemail; and the one or more identifiers or data fields indicating that the terminating subscriber was not reachable in the wireless telecommunications network can be associated with the data on communications in a wireless telecommunications network that was received by the receiver 216. In an aspect, these identifiers and/or data fields can be present in CDRs.

In one or more aspects, the total number of terminating communications in the wireless telecommunications network can include all communication attempts on the terminating end. In such aspects, all communication or call attempts on the terminating end includes all communications from an originating subscriber to a terminating subscriber. In aspects, identifiers and/or data fields in the CDR or other data associated with communications can identify such communications or calls from an originating subscriber to a terminating subscriber.

In various aspects, the evaluator 220 can evaluate and/or determine if the rate of communications terminating to voicemail due to one or more network failures, e.g., determined by the determiner 218, exceeds a threshold value. In one or more aspects, the threshold value can be any value selected by an operator for a particular purpose. In one aspect, the threshold value can represent an average rate of communications terminating to voicemail due to one or more network failures spanning a prior time interval. For instance, in one example aspect, the threshold value can be an average daily rate of communications terminating to voicemail due to one or more network failures for the past three days, five days, one week, two weeks, one month, two months, three months, six months, or one year. In certain aspects, the threshold value can represent a national average rate of communications terminating to voicemail due to one or more network failures for a prior time interval. In one or more aspects, the evaluator 220 can evaluate and/or determine if the rate of communications terminating to voicemail due to one or more network failures, e.g., determined by the determiner 218, exceeds a threshold value by comparing the rate of communications terminating to voicemail due to one or more network failures to the threshold value.

Optionally, the identifier 222 can identify communications terminating to voicemail due to one or more network failures that exhibit one or more of the same or similar attributes. In various aspects, the one or more of the same or similar attributes can be one or more of the same or similar identifiers and/or data fields in the received data. In the same or alternative aspects, the one or more similar attributes can be one or more of the same of similar identifiers and/or data fields in CDRs. A non-limiting list of attributes can include geographical region, device manufacturer, device type, device operating system, location information associated with a device, cell site, network node, one or more radios at a cell site, radio manufacturer, network node software, or combinations thereof.

In various aspects, the identifier 222 can identify communications terminating to voicemail due to one or more network failures that exhibit one or more of the same or similar attributes in response to a determination that the rate of communications terminating to voicemail due to one or more network failures exceeds the threshold value. For instance, in aspects, once the threshold is exceeded, the identifier 222 can attempt to identify one or more of the same or similar attributes for the communications terminating to voicemail due to network failures. In one example, the identifier 222 may identify that the communications terminating to voicemail due to network failures included a terminating subscriber having a common software version on their device and/or a common device. In another example, the identifier 222 may identify that the communications terminating to voicemail due to network failures included terminating subscribers in the same or similar geographic region. In yet another example, the identifier 222 may identify that the communications terminating to voicemail due to network failures included scenarios where the originating subscriber and/or terminating subscriber were utilizing cell site radios of a same or similar type/manufacturer or model. In still another example, the identifier 222 may identify that the communications terminating to voicemail due to network failures involved network nodes, e.g., TAS nodes, that utilized the same or similar software of firmware version. It should be understood that the aforementioned examples are not limiting on the systems and methods disclosed herein; rather, these examples are meant to highlight various potential sources of network failures. In one aspect, the identifier 222 can perform at least part of its function through the instruction and/or direction of a user or operator, e.g., by the operator or user selecting one or more attributes to filter or limit the communications terminating to voicemail due to network failures to discern if such attributes are present or prevalent in the communications terminating to voicemail due to network failures.

In various aspects, the assigner 224 assigns an action, e.g., in response to the rate of communications terminating to voicemail due to one or more network failures exceeding the threshold value. In an aspect, the assigner 224 can assign any type of action including, but not limited to, one or more alerts, and/or one or more mitigation steps. In certain aspects, the one or more alerts and/or one or more mitigation steps can be stored in a database, e.g., the database 210. In various aspects, the one or more alerts can be designed to alert one or more operators that the rate has exceeded a threshold value. In certain aspects, the one or more mitigation steps can include a report detailing the network failure, e.g., one or more of the same or similar attributes of the communications terminating to voicemail due to one or more network failures. In the same or alternative aspects, the one or more mitigation steps can include an adjustment of one or more network settings and/or update of specific software or firmware utilized by specific network components.

In certain aspects, the communicator 226 is generally responsible for communicating and/or implementing the actions assigned by the assigner 224. In certain aspects, in response to the rate exceeding the threshold, the communicator 226 may communicate an alert assigned by the assigner 224 to one or more computing devices, e.g., one or more computing devices associated with one or more operators or users. In one example aspect, the communicator 226 may transmit a report, email, or the like to one or more computing devices, e.g., one or more computing devices associated with one or more operators or users. In the same or alternative aspects, the communicator 226 may provide an alert or indication as a graphical element on a graphical user interface for one or more computing devices, e.g., one or more computing devices associated with one or more operators or users. In various aspects, the communicator 226 may provide an alert as part of a graphical representation of the rate of communications terminating to voicemail due to network failures, which may also optionally include a representation of the threshold value.

In one or more aspects, the communicator 226 can communicate one or more mitigation steps or actions to one or more computing devices, e.g., one or more computing devices associated with one or more operators or users. In certain aspects, as discussed above, the mitigation steps and/or actions can be any steps of actions that may correct one or more network failures that may cause, or are associated with, communications terminating to voicemail due to one or more network failures. In such aspects, as discussed above, the mitigation steps and/or actions can include an adjustment of one or more network settings and/or update of specific software or firmware utilized by specific network components. In various aspects, the communicator 226 can implement or cause the implementation of the mitigation steps and/or actions.

In the same or alternate aspects, the communicator 226 may provide information on the rate of communications terminating to voicemail due to one or more network failures whether or not such a rate exceeds a threshold value. In such aspects, the communicator 226 can provide a graphical representation of one or more determined rates of communications terminating to voicemail due to one or more network failures with or without depicting the threshold value, as an informational tool for an operator.

It should be understood that any or all of the actions and/or functions of the network analyzer 212 can be performed automatically. In the same or alternative aspects, any or all of the functions of the network analyzer 212 may be modified and/or implemented based on operator instructions.

Figure 3:
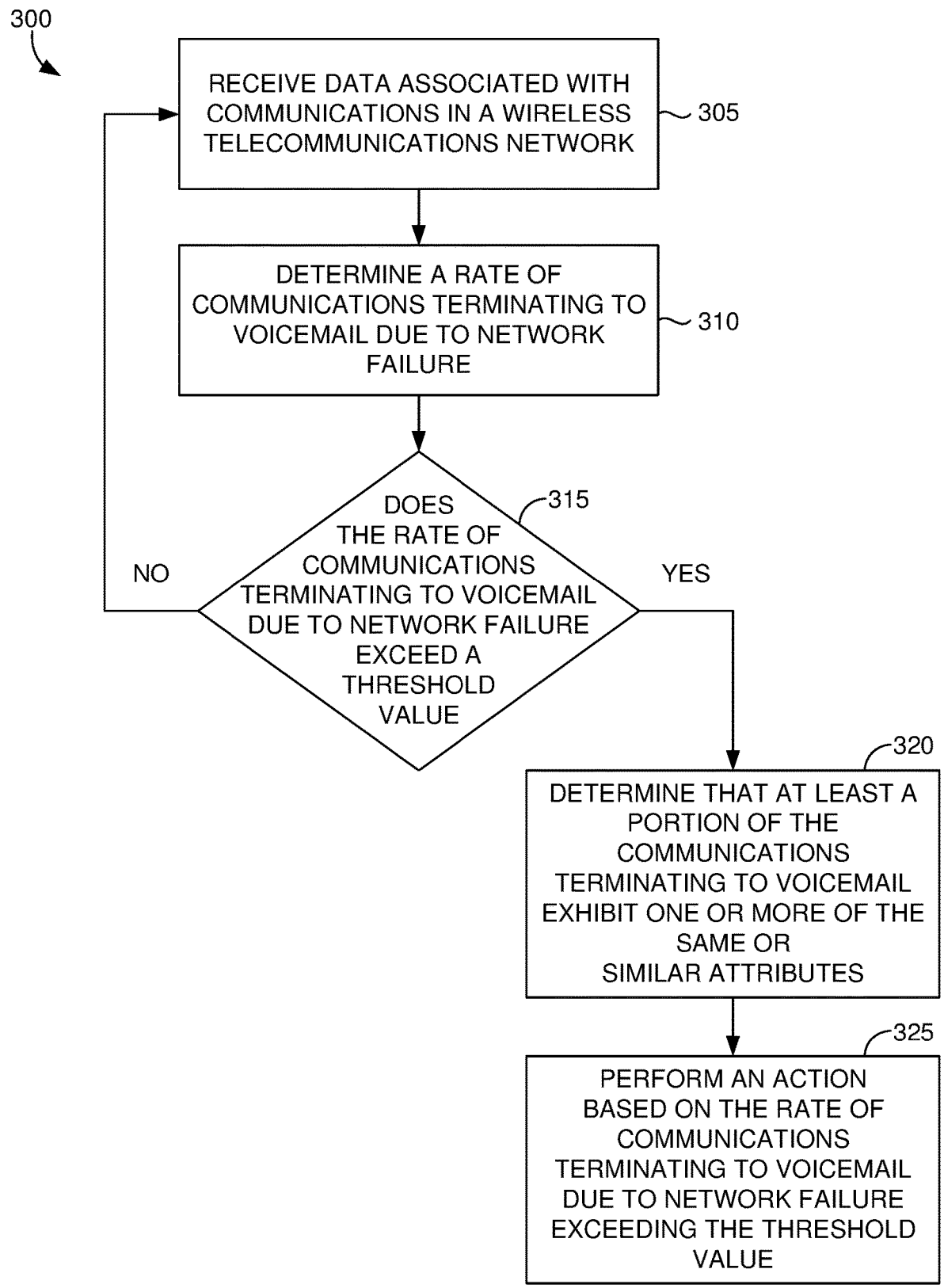
FIG. 3 depicts a flow diagram of an exemplary method for determining and correcting network failures in a wireless telecommunications network, in accordance with aspects of the present disclosure.

FIG. 3 depicts a flow diagram of a method 300 for determining and correcting network failures in a wireless telecommunications network, e.g., the network 208 discussed above with reference to FIG. 2. The method 300 can include the step 305 of receiving data associated with communications in a wireless telecommunications network. In aspects, the receiver 216 of the network analyzer 212 described above with reference to FIG. 2 can receive the data associated with communications in the wireless telecommunications network. As discussed above, the data associated with communications in a wireless telecommunications network can include any or all of the properties and parameters of the data discussed above with reference to the network analyzer 212 and/or the receiver 216 of FIG. 2. For instance, in certain aspects, the data associated with communications in a wireless telecommunications network can include any or all properties of the telecommunication event, including, but not limited to: time of call, duration of call, identification of how call terminated, e.g., the terminating party did or did not receive the call, the call went to voicemail, etc., subscriber information, device information, network information, location information, and the like. In certain aspects, the data can include charging data records (CDRs).

In the step 310, a rate of communications terminating to voicemail due to one or more network failures is determined. In one or more aspects, the determiner 218 of the network analyzer 212 of FIG. 2 can perform the step 310. In various aspects, any or all of the parameters of the determiner 218 can apply in this step 310. For example, in various aspects, the rate of communications terminating to voicemail due to a network failure can be determined using the following quotient: number of communications terminating to voicemail due to one or more network failures/total number of terminating communications. The parameters of the terms in such a quotient are described above in detail with reference to the network analyzer 212 of FIG. 2 and can also apply in this step.

The step 315 of the method 300 can include determining if the rate of communications terminating to voicemail due to one or more network failures exceeds a threshold value. As discussed above, the threshold value can be any value selected by an operator for a particular purpose. In certain aspects, as discussed above, the threshold value can represent an average rate of communications terminating to voicemail due to one or more network failures for a prior specified time interval.

In certain aspects, when the rate of communications terminating to voicemail due to one or more network failures does not exceed the threshold value, the method 300 can optionally begin again at the step 305. In certain aspects, when the rate does not exceed a threshold value, the step 305 may include awaiting a predetermined time interval for the receipt and/or aggregation of additional data associated with communications in a wireless telecommunications network. In one aspect, the step 305 and/or the method 300 may occur once an hour, once every six hours, once every 12 hours, or once a day. In one or more aspects, the evaluator 220 of the network analyzer 212 discussed above with reference to FIG. 2 may perform the step 315.

In various aspects, when the rate of communications terminating to voicemail due to one or more network failures exceeds the threshold value, the method 300 can optionally proceed to the step 320. In the step 320, it is determined that at least a portion of the communications terminating to voicemail exhibit one or more of the same of similar attributes. In certain aspects, the identifier 222 of the network analyzer 212 described above with reference to FIG. 2 can perform the step 320 of the method 300. In certain aspects, all the features, properties, and parameters discussed above with reference to the identifier 222 of the network analyzer 212 of FIG. 2 can apply in this step 320 of the method 300.

The method 300 includes the step 325 that includes performing an action based on the rate of communications terminating to voicemail due to one or more network failures exceeding a threshold value. In various aspects, the action can be any type of action including, but not limited to, providing one or more alerts, and/or taking or recommending one or more mitigation steps. In certain aspects, the one or more mitigation steps can include a report detailing the network failure, e.g., one or more of the same or similar attributes are present in the communications terminating to voicemail due to one or more network failures. In the same or alternative aspects, the one or more mitigation steps can include an adjustment of one or more network settings and/or update of specific software or firmware utilized by specific network components. As discussed above, the alert and/or mitigating steps can be communicated to one or more computing devices, e.g., one or more computing devices associated with one or more operators or users, in various aspects. As discussed above, the alert may be a graphical element on a graphical user interface for one or more computing devices, e.g., one or more computing devices associated with one or more operators or users. As also discussed above, in the same or alternative aspects, the alert may be part of a graphical representation of the rate of communications terminating to voicemail due to network failures, which may also optionally include a representation of the threshold value. In certain aspects, the mitigation steps and/or actions can be any steps of actions that may correct one or more network failures that may cause, or are associated with, communications terminating to voicemail due to one or more network failures. In certain aspects, the communicator 226 of the network analyzer 212 can perform all or a portion of the step 325. In certain aspects, the assigner 224 of the network analyzer 212 can assign one or more actions to be performed in the step 325. Any or all of the features, properties, and parameters of the communicator 226 and the assigner 224 can be associated with this step 325.

In various aspects, once the step 325 is performed, the method 300 may return to the step 305 to begin again. In aspects, as discussed above, the step 305 may begin again, after completing the step 325, after a predetermined time interval. In one or more aspects, performing the method 300 again after performing the one or more actions in the step 325, can aid in understanding if the prior performed actions, e.g., the actions of the prior step 325, corrected the network failure.

Figure 4:
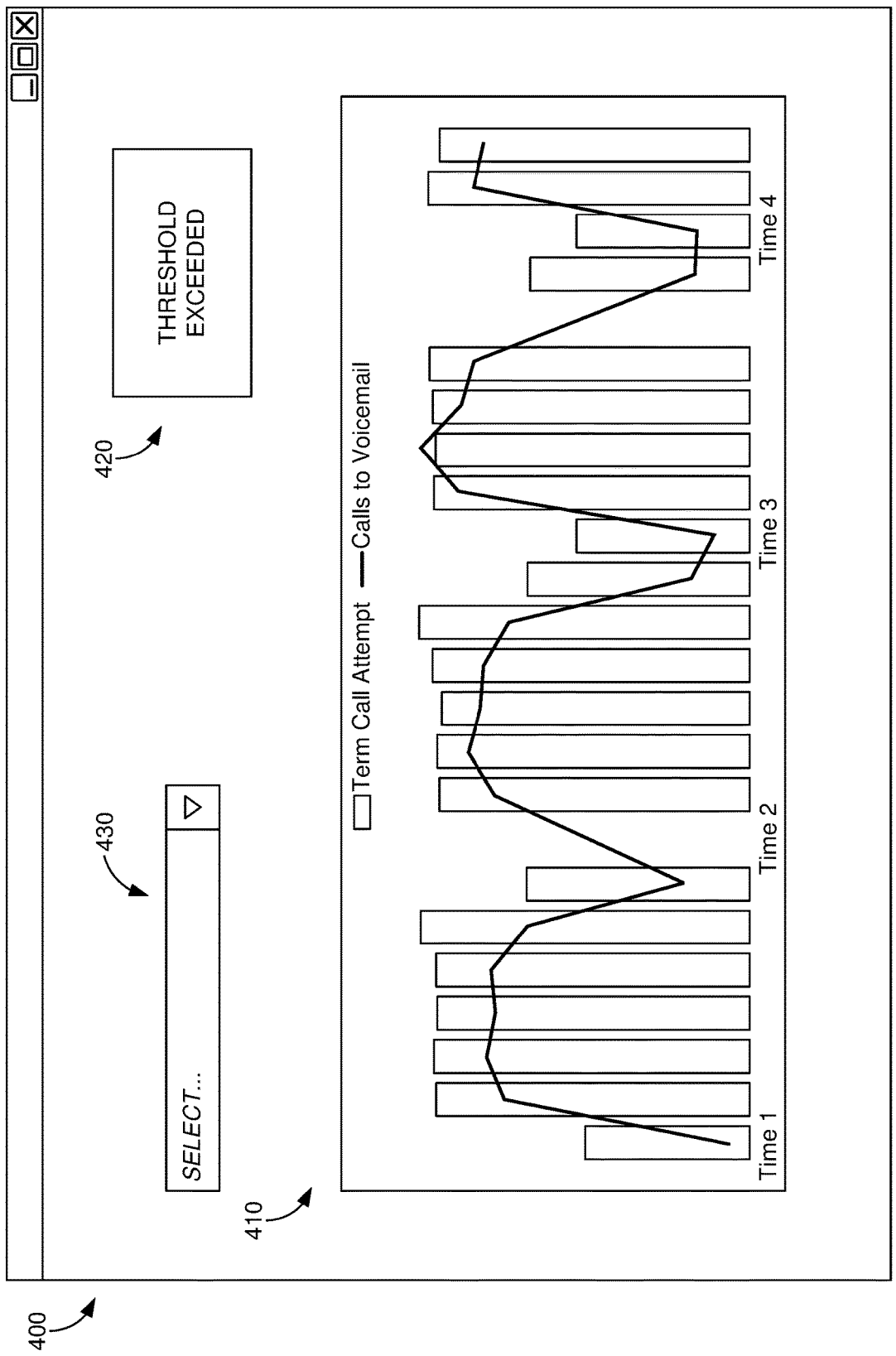
FIG. 4 depicts a user interface that includes an example graphical representation of a rate of communications terminating to voicemail due to one or more network failures, in accordance with aspects of the present disclosure.

As discussed above, in various aspects, the systems and methods disclosed herein may include providing a graphical representation of the rate of communications terminating to voicemail due to network failures, e.g., as part of a graphical user interface. FIG. 4 depicts one example graphical user interface 400. It should be understood that the graphical user interface 400 is schematically depicted and is just one example of a user interface contemplated by the systems and methods disclosed herein. In various aspects, the graphical user interface 400 can be communicated to one or computing devices associated with the network, such as one or more computing devices associated with one or more operators or users. In certain aspects, the graphical user interface 400 can include a graphical representation 410 of a rate of communications terminating to voicemail due to network failures. In the aspect depicted in FIG. 4, the rate of communications terminating to voicemail due to network failures is depicted as a trend line over a plurality of individual bar graphs that represent the total number of terminating calls. The graphical representation 410 depicts both the rate of communications terminating to voicemail due to network failures and the total number of terminating calls over specific time intervals, as depicted on an x-axis. It should be understood that, in an aspect, the graphical representation 410 may include different y-axis scales and/or values for the rate of communications terminating to voicemail and the total number of terminating calls. In an aspect not depicted in FIG. 4, the graphical representation may also provide a graphical depiction of one or more threshold values.

In the aspect depicted in FIG. 4, the graphical user interface 400 includes an alert 420 that indicates that the rate of communications terminating to voicemail due to one or more network failures exceeded a threshold value. In various aspects, the alert can be present when the rate of communications terminating to voicemail due to network failures for the most recent time interval depicted in the graphical representation 410 exceeds the threshold value, e.g., as opposed to historical or prior depicted rates exceeding the threshold value.

In certain aspects, the graphical user interface 410 can include a selection component 430. In various aspects, the selection component 430 can allow a user to filter and/or identify a subset of communications terminating to voicemail due to one or more network failures. In such an aspect, once the user selects one or more attributes to filter the communications terminating to voicemail due to one or more network failures, the graphical representation may update to provide a graphical representation of the rate of communications terminating to voicemail for the communications having the one or more selected attributes. In such aspects, this selection component 430 and updated graphical representation can facilitate further refinement of identification of network failures based on a rate of calls terminating to voicemail.

Figure 5:
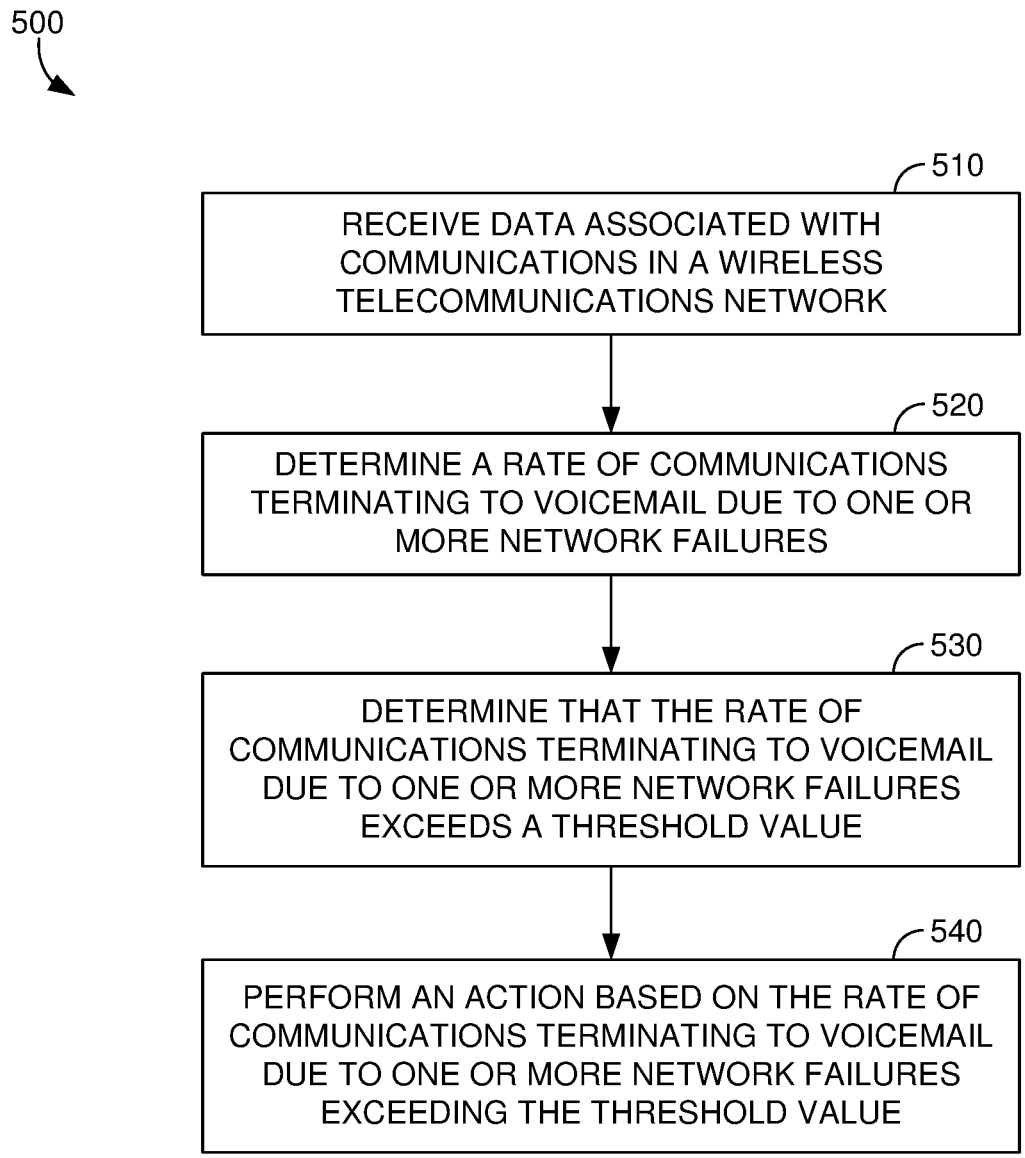
FIG. 5 depicts a flow diagram of another exemplary method for determining and correcting network failures in a wireless telecommunications network, in accordance with aspects of the present disclosure.

FIG. 5 is a flow chart of a method 500 for determining and correcting network failures in a wireless telecommunications network, e.g., the network 208 discussed above with reference to FIG. 2. The method 500 can include the step 510 of receiving data associated with communications in a wireless telecommunications network. In aspects, the receiver 216 of the network analyzer 212 described above with reference to FIG. 2 can receive the data associated with communications in the wireless telecommunications network. In certain aspects, as discussed above, data associated with communications in a wireless telecommunications network can include any or all of the properties and parameters of the data discussed above with reference to the network analyzer 212 and/or the receiver 216 of FIG. 2. For instance, in certain aspects, the data associated with communications in a wireless telecommunications network can include any or all properties of the telecommunication event, including, but not limited to: time of call, duration of call, identification of how call terminated, e.g., the terminating party did or did not receive the call, the call went to voicemail, etc., subscriber information, device information, network information, location information, and the like. In certain aspects, the data can include charging data records (CDRs).

The step 520 of the method 500 includes determining a rate of communications terminating to voicemail due to one or more network failures. In one or more aspects, the determiner 218 of the network analyzer 212 of FIG. 2 can perform the step 310. In various aspects, any or all of the parameters of the determiner 218 can apply in this step 520. For example, in various aspects, the rate of communications terminating to voicemail due to one or more network failures can be determined using the following quotient: number of communications terminating to voicemail due to one or more network failures/total number of terminating communications. The parameters of the terms in such a quotient are described above in detail with reference to the network analyzer 212 of FIG. 2 and can also apply in this step.

The step 530 of the method 500 can include determining if the rate of communications terminating to voicemail due to one or more network failures exceeds a threshold value. In various aspects, the threshold value can be any value selected by an operator for a particular purpose. In one example aspect, as discussed above, the threshold value can represent an average rate of communications terminating to voicemail due to one or more network failures for a prior specified time interval. In various aspects, the step 530 can be performed by the evaluator 220 of the network analyzer 212 described above with reference to FIG. 2.

The step 540 of the method 500 can include performing an action based on the rate of communications terminating to voicemail due to one or more network failures exceeding a threshold value. In various aspects, the action can include providing one or more alerts, and/or taking one or more mitigation steps. In certain aspects, the one or more mitigation steps can include a report detailing the network failure, e.g., identifying one or more of the same or similar attributes of the communications terminating to voicemail due to one or more network failures. In various aspects, such a report and/or the information provided therein can facilitate the appropriate network, radio, and/or device teams to correct the issues and/or failures causing the communications terminating to voicemail due to one or more network failures. In the same or alternative aspects, the one or more mitigation steps can include an adjustment of one or more network settings and/or update of specific software or firmware utilized by specific network components. As discussed above, the alert and/or mitigating steps can be communicated to one or more computing devices, e.g., one or more computing devices associated with one or more operators or users, in various aspects. As discussed above, the alert may be a graphical element on a graphical user interface for one or more computing devices, e.g., one or more computing devices associated with one or more operators or users. As also discussed above, in the same or alternative aspects, the alert may be part of a graphical representation of the rate of communications terminating to voicemail due to network failures, which may also optionally include a representation of the threshold value. In certain aspects, the mitigation steps and/or actions can be any steps of actions that may correct one or more network failures that may cause, or are associated with, communications terminating to voicemail due to one or more network failures. In certain aspects, the communicator 226 of the network analyzer 212 can perform all or a portion of the step 540. In certain aspects, the assigner 224 of the network analyzer 212 can assign one or more actions to be performed in the step 540.

Figure 6:
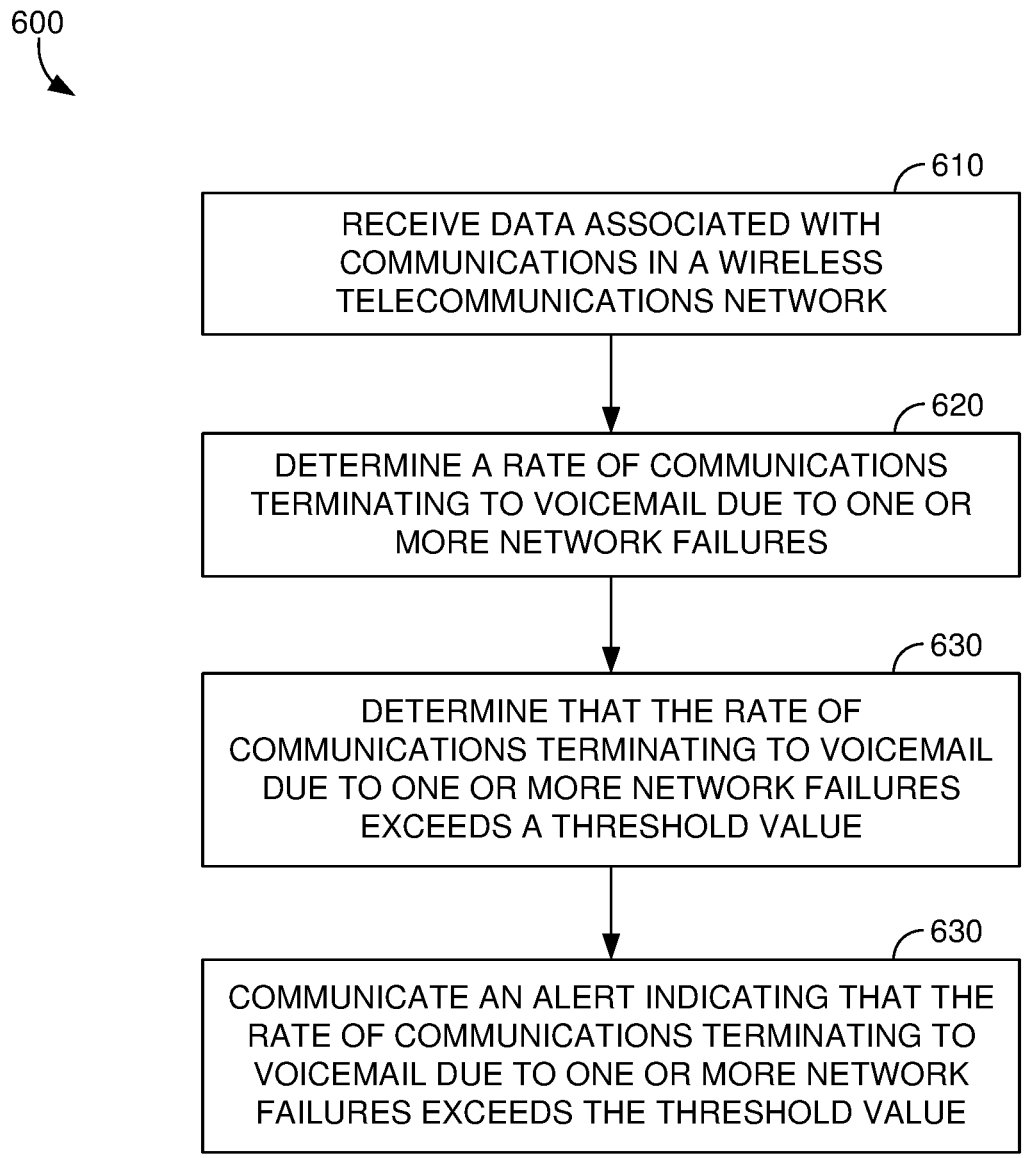
FIG. 6 depicts a flow diagram of yet another exemplary method for determining and correcting network failures in a wireless telecommunications network, in accordance with aspects of the present disclosure.

FIG. 6 is a flow chart of a method 600 for determining and correcting network failures in a wireless telecommunications network, e.g., the network 208 discussed above with reference to FIG. 2. The method 600 can include the step 610 of receiving data associated with communications in a wireless telecommunications network. In aspects, the receiver 216 of the network analyzer 212 described above with reference to FIG. 2 can receive the data associated with communications in the wireless telecommunications network. In certain aspects, as discussed above, data associated with communications in a wireless telecommunications network can include any or all of the properties and parameters of the data discussed above with reference to the network analyzer 212 and/or the receiver 216 of FIG. 2. For instance, in certain aspects, the data associated with communications in a wireless telecommunications network can include any or all properties of the telecommunication event, including, but not limited to: time of call, duration of call, identification of how call terminated, e.g., the terminating party did or did not receive the call, the call went to voicemail, etc., subscriber information, device information, network information, location information, and the like. In certain aspects, the data can include charging data records (CDRs).

The step 620 of the method 600 includes determining a rate of communications terminating to voicemail due to one or more network failures. In one or more aspects, the determiner 218 of the network analyzer 212 of FIG. 2 can perform the step 310. In various aspects, any or all of the parameters of the determiner 218 can apply in this step 620. For example, in various aspects, the rate of communications terminating to voicemail due to one or more network failures can be determined using the following quotient: number of communications terminating to voicemail due to one or more network failures/total number of terminating communications. The parameters of the terms in such a quotient are described above in detail with reference to the network analyzer 212 of FIG. 2 and can also apply in this step.

The step 630 of the method 600 can include determining if the rate of communications terminating to voicemail due to one or more network failures exceeds a threshold value. In various aspects, the threshold value can be any value selected by an operator for a particular purpose. In one example aspect, as discussed above, the threshold value can represent an average rate of communications terminating to voicemail due to one or more network failures for a prior specified time interval. In various aspects, the step 530 can be performed by the evaluator 220 of the network analyzer 212 described above with reference to FIG. 2.

The step 640 of the method 600 can include communicating an alert that the rate of communications terminating to voicemail due to one or more network failures exceeds the threshold value. In various aspects, the step 640 can be performed in response to the step 630 of determining that the rate of communications terminating to voicemail due to one or more network failures exceeds the threshold value. In certain aspects, the alert can be any type of alert suitable for use in the systems and methods disclosed herein. In one aspect, as discussed above, the alert can be a communication, e.g., an email, or other form of communication, and/or can be a graphical element on a graphical user interface for one or more computing devices, e.g., one or more computing devices associated with one or more operators or users. As also discussed above, in the same or alternative aspects, the alert may be part of a graphical representation of the rate of communications terminating to voicemail due to network failures, which may or may also include a representation of the threshold value. In various aspects, the alert may also be accompanied by additional information, e.g., mitigation steps and/or a report, e.g., a report identifying one or more similar attributes of the communications terminating to voicemail due to one or more network failures, which can facilitate correction of the network failure to improve customer experience.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computerized system comprising:
one or more processors; and
a non-transitory computer storage media storing computer-useable instructions that, when used by the one or more processors, cause the one or more processors to:
by a network analyzer:
receive data associated with communications in a wireless telecommunications network;
determine a rate of communications terminating to voicemail due to one or more network failures;
determine that the rate of communications terminating to voicemail due to one or more network failures exceeds a threshold value; and
adjust one or more network settings to correct the one or more network failures exceeding the threshold value associated with the rate of communications terminating to voicemail.

2. The computerized system according to claim 1, wherein the data associated with the communications in the wireless telecommunications network comprises charging data records.

3. The computerized system according to claim 2, wherein the charging data records are generated by a telephony application server associated with the wireless telecommunications network.

4. The computerized system according to claim 1, wherein the determining the rate of communications terminating to voicemail due to one or more network failures comprises calculating a number of communications terminating to voicemail due to one or more network failures relative to all terminating communications, using the following quotient:
number of communications terminating to voicemail due to one or more network failures/total number of terminating communications,
wherein the number of communications terminating to voicemail due to one or more network failures includes the communication records, in the data associated with communications in the wireless telecommunications network, that include: one or more identifiers that a communication was forwarded to voicemail; and that also include one or more identifiers specifying that the terminating subscriber was not reachable in the wireless telecommunications network.

5. The computerized system according to claim 1, wherein the action comprises communicating an alert that the rate of communications terminating to voicemail due to one or more network failures exceeds the threshold value.

6. The computerized system according to claim 1, wherein the threshold value is determined based on historic rates of communications terminating to voicemail due to one or more network failures.

7. The computerized system according to claim 1, wherein the rate of communications terminating to voicemail due to one or more network failures is determined based on the data associated with communications in a wireless telecommunications network spanning a time interval of at least one hour, at least one day, at least three days, or at least seven days.

8. The computerized system according to claim 1, further comprising: determining that at least a portion of the communications terminating to voicemail due to one or more network failures each exhibit one or more of the same or similar attributes.

9. The computerized system according to claim 8, wherein the one or more of the same or similar attributes comprise: geographical region, device manufacturer, device type, device operating system, location information associated with a device, a cell site, a network node, one or more radios at a cell site, radio manufacturer, network node software, or a combination thereof.

10. A method for determining and correcting network failures in a wireless telecommunications network, the method comprising:
by a network analyzer:
receiving data associated with communications in a wireless telecommunications network;
determining a rate of communications terminating to voicemail due to one or more network failures;

determining that the rate of communications terminating to voicemail due to one or more network failures exceeds a threshold value; and adjusting one or more network settings to correct the one or more network failures exceeding the threshold value associated with the rate of communications terminating to voicemail.

11. The method according to claim 10, wherein the data associated with communications in the wireless telecommunications network comprises charging data records.

12. The method according to claim 10, wherein the determining the rate of communications terminating to voicemail due to one or more network failures comprises calculating a number of communications terminating to voicemail due to one or more network failures relative to all terminating communications, using the following quotient:

number of communications terminating to voicemail due to one or more network failures/total number of terminating communications.

13. The method according to claim 12, wherein the number of communications terminating to voicemail due to one or more network failures includes the communication records, in the data associated with communications in the wireless telecommunications network, that include: one or more identifiers that a communication was forwarded to voicemail; and that also include one or more identifiers specifying that the terminating subscriber was not reachable in the wireless telecommunications network.

14. The method according to claim 10, wherein the wireless telecommunications network utilizes one or more of the following wireless communication protocols: 4G, LTE, or 5G.

15. The method according to claim 10, wherein the action comprises communicating an alert that the rate of communications terminating to voicemail due to one or more network failures exceeds the threshold value.

16. The method according to claim 10, further comprising displaying a graphical representation of the rate of communications terminating to voicemail due to one or more network failures.

17. The method according to claim 16, wherein the graphical representation provides an indication that the rate of communications terminating to voicemail due to one or more network failures exceeds the threshold value.

18. The method according to claim 10, further comprising identifying a subset of communications terminating to voicemail due to one or more network failures that exhibit one or more of the same or similar attributes.

19. The method according to claim 18, wherein the one or more of the same or similar attributes comprise: geographical region, device manufacturer, device type, device operating system, location information associated with a device, a cell site, a network node, one or more radios at a cell site, radio manufacturer, network node software, or a combination thereof.

20. A computerized system comprising:
one or more processors; and
a non-transitory computer storage media storing computer-useable instructions that, when used by the one or more processors, cause the one or more processors to:
by a network analyzer:
receive data associated with communications in a wireless telecommunications network, wherein the data associated with communications in the wireless telecommunications network comprises charging data records;
determine a rate of communications terminating to voicemail due to one or more network failures;
determine that the rate of communications terminating to voicemail due to one or more network failures exceeds a threshold value;
communicate an alert indicating that the rate of communications terminating to voicemail due to one or more network failures exceeds the threshold value; and
adjust one or more network settings to correct the one or more network failures exceeding the threshold associated with the rate of communications terminating to voicemail.

\* \* \* \* \*